UNITED STATES PATENT OFFICE.

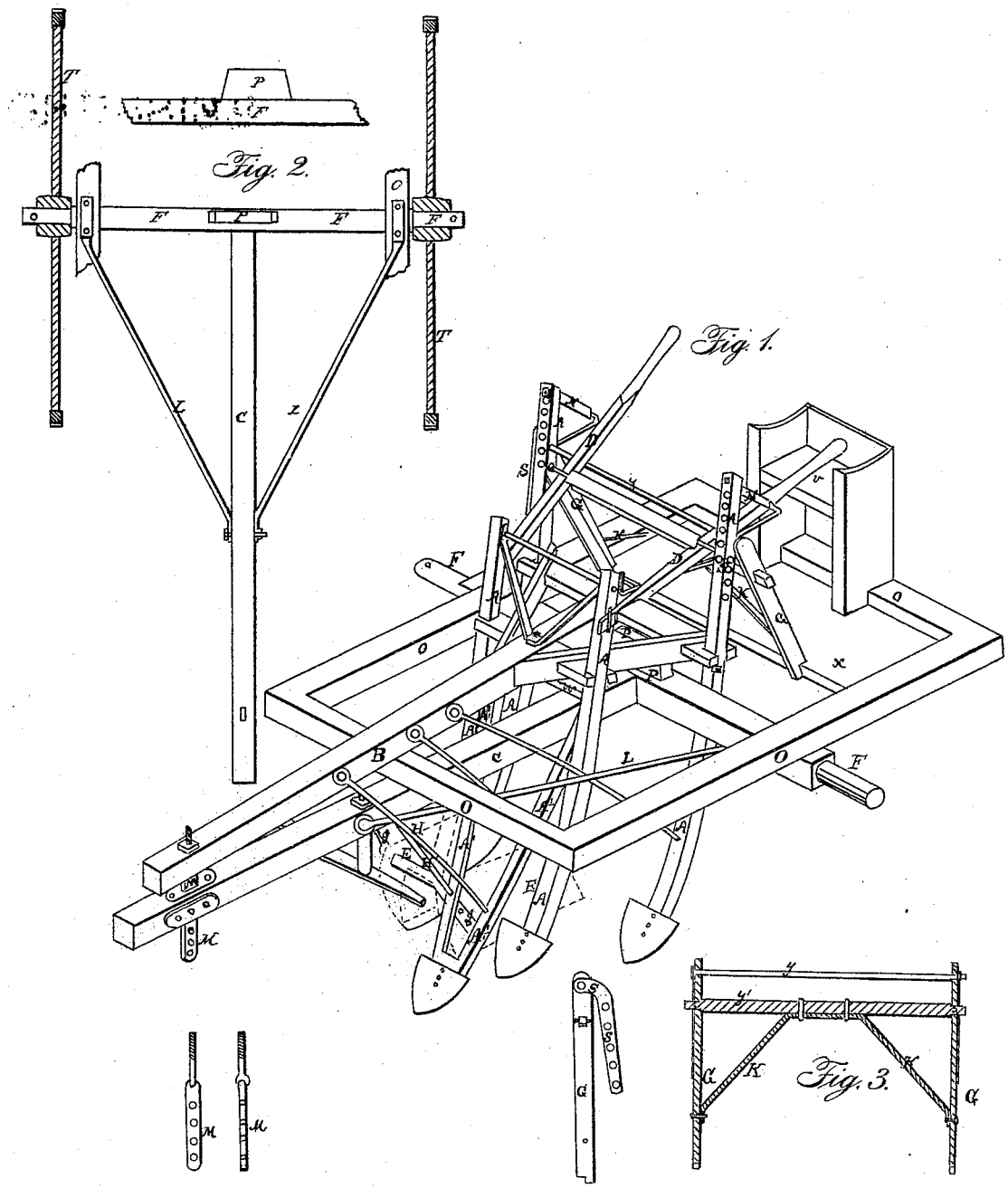

IRULUS R. SMITH, OF ELGIN, ILLINOIS.

IMPROVEMENT IN CULTIVATORS.

Specification forming part of Letters Patent No. 28,016, dated April 24, 1860.

REISSUED

*To all whom it may concern:*

Be it known that I, IRULUS R. SMITH, of Elgin, Cook county, in the State of Illinois, have invented a new and useful machine for the purpose of cultivating corn, potatoes, plowing in small grain, and for a stirring-plow; and I do hereby declare that the following is a full, clear, and exact description of the construction and operation of the same, reference being had to the annexed drawings, making a part of this specification, in which—

Figure 1 is an isometrical view; Fig. 2, a ground plan of tongue, axle-wheels, and stirrup in section; and Fig. 3, a back plan of truss for holding up cultivator in section, reference being had to the different parts by letters.

The nature of my invention consists in the arrangement of devices hereinafter described.

A represents four shovel-plows. A' represents one shovel-plow in front. Two cheek or guard pieces are marked E. The said shovel A' and the cheek or guard pieces are made movable. For the purpose of cultivating corn and potatoes, the shovel A', with the rods and braces for the same, (marked H,) being removed from the rod, (marked W,) and the cheek or guard pieces E and braces (marked J) are fastened on in their places, the use of the cheek or guard pieces being to prevent the corn or potatoes from being covered with dirt or injured by the shovels. The shovels are to be made of plow-steel, and the cheek or guard pieces to be made of steel or iron, and each to be fastened to their respective standards by rivets or bolts. The standards are to be made of iron, oak, beech, maple, hickory, or any other suitable material, and to be fastened to the beam marked B by bolts and braces of iron and wood, as shown in the drawings, except the movable shovel A' in front, which is fastened to the rod marked W, which runs through the front standards A and to the beam B by rods marked H, substantially as shown in model and drawings. There is also a truss for keeping the shovels or plows clear from the ground when the same are not in use in moving the machine or turning the same around, said truss consisting of the pieces of iron marked S, fastened to the outside of the back standards A by bolts or rivets, as shown in drawings, the rod Y, which runs through the irons S, the standards G, which play on the rod Y, the stretcher Y', which holds the standards apart and firm, and the iron braces K.

The operation of the above-described truss is such that the pieces G, while resting on the platform X, keep the plows clear from the ground, but when in operation or use, being pushed clear of the platform X, allow the shovels to drop into the earth as required for service.

There are also two handles (marked D) fastened to the front standards A by stirrups and running beneath the roller D', the shoulders of which hold them the right distance apart, and the shaft of said roller to keep the handles from moving out of their places upward. There are also two other handles (marked N) fastened to the back standards A, as shown in the drawings, the handles D to be used while sitting on the seat V and the handles N to be used while standing up, said handles being for the purpose of holding, guiding, driving, and lifting the whole machine, the joint M being the fulcrum, so that by lifting one handle above the other the shovels can be moved to either side to avoid the hills of corn or potatoes when the rows are not straight.

Said machine or cultivator is attached to the two-wheeled carriage marked O by the movable joint M running through the tongue C, the design of said carriage being to govern the depth of plowing, to keep the machine steady, to allow cultivating until the corn is about four feet high, the driver to stand upon for the purpose of holding up the cultivator by means of the truss G when not in use, and as a means of carrying the machine easily from one place to another. The wheels of said carriage are not shown on Fig. 1 in plan, but in section on Fig. 2, being about six feet in diameter, or any other required size.

What I claim as my invention, and desire to secure by Letters Patent, is—

The combination of the long standards A and A', the cheek or guard pieces E, the movable handles N, the saddle P for the beam B to roll upon, the truss G, consisting of the pieces of iron S, the standards G G, the rod Y, the stretcher Y', and the iron braces K, and the joint M, attached to the two-wheeled carriage O, as described, and for the purposes specified.

IRULUS R. SMITH.

Witnesses:
DAVID CAMPBELL,
ELI WHITNEY.